United States Patent [19]
Burian et al.

[11] Patent Number: 4,686,671
[45] Date of Patent: Aug. 11, 1987

[54] CELLULAR COMMUNICATION SYSTEM OPERABLE WITH TRANSMISSION PATHFAULT

[75] Inventors: Theodor Burian, Weil der Stadt; Herbert Siegel, Ditzingen, both of Fed. Rep. of Germany

[73] Assignee: Standard Elektrik Lorenz AG, Stuttgart, Fed. Rep. of Germany

[21] Appl. No.: 715,146

[22] Filed: Mar. 22, 1985

[51] Int. Cl.[4] .......................... H04J 3/00; H04Q 7/04
[52] U.S. Cl. .................................... 370/88; 370/95; 455/33; 455/56
[58] Field of Search ............... 455/33, 54, 56; 370/16, 370/88, 93, 95, 110.1; 179/2 E B; 379/59, 60

[56] References Cited

U.S. PATENT DOCUMENTS

| | | | |
|---|---|---|---|
| 3,652,798 | 3/1972 | McNeilly et al. | 370/88 |
| 3,731,002 | 5/1973 | Pierce | 370/88 |
| 4,530,085 | 7/1985 | Hamada et al. | 370/16 |
| 4,542,496 | 9/1985 | Takeyama et al. | 370/16 |

Primary Examiner—Robert L. Griffin
Assistant Examiner—Elissa Seidenglanz
Attorney, Agent, or Firm—Christie, Parker & Hale

[57] ABSTRACT

A communication system with fixed stations (FS), mobile stations (MS), and control stations (LS) is disclosed in which the control stations are interconnected by transmission paths and have additional, closed transmission paths connected to them. In the transmission paths, the fixed stations (FS) are arranged in series. Communication is on a time-division-multiplex basis. The control stations (LS) assign the TDM channels to the individual mobile stations (MS) via the fixed station (FS) in charge of the respective mobile station.

5 Claims, 2 Drawing Figures

CELLULAR COMMUNICATION SYSTEM OPERABLE WITH TRANSMISSION PATHFAULT

The present invention relates to a cellular communications system, such as disclosed in U.S. application Ser. No. 374,471, filed May 3, 1982, abandoned, and the continuation application Ser. No. 728,143, filed Apr. 26, 1985, also abandoned, entitled "Communication System", of K. D. Eckert et al., which corresponds to their German priority application DE-OS No. 31 18 018.

Each cell contains a control station and two or more fixed stations (base stations) which are connected to the control station by transmission paths and are controlled by this control station. Transmission paths are also provided between the control stations.

The object of the invention is to provide a communication system whose operation is maintained in the event of a fault in a transmission path.

SUMMARY OF THE INVENTION

The communication system according to the invention has the advantage that, in the event of a fault in a transmission path, each fixed station is connected to a control station. As fixed stations are connected into the lines interconnecting the control stations, fewer paths are needed than in the prior art, and the usage factors of the paths are improved.

BRIEF DESCRIPTION OF THE DRAWING

An embodiment of the invention will now be explained in more detail with reference to the accompanying drawings, in which.

DESCRIPTION OF THE PREFERRED EMBODIMENTS

Figure 1:
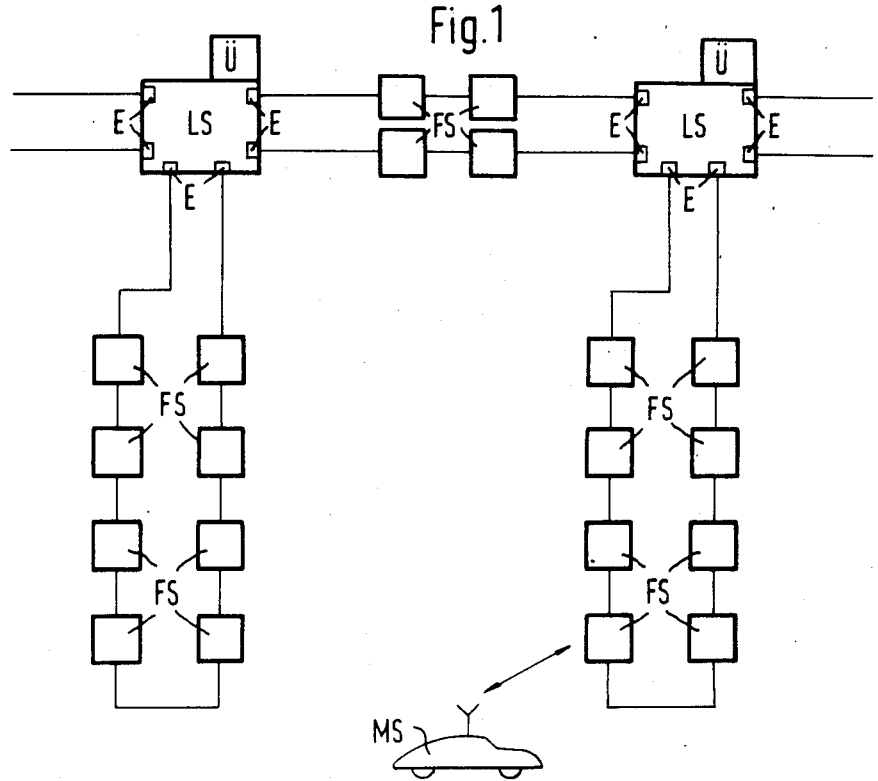
FIG. 1 is a block diagram showing the structure of the communication system.

The part of the novel communication system shown in FIG. 1 contains two control stations LS, each of which is colocated with an interface facility U providing the connection to a telephone network. The control stations LS are interconnected by two transmission paths, called "interconnecting lines". Furthermore, a closed transmission path, called "ring line", is connected to each control station LS. These transmission paths are implemented with optical communication cables. It is also possible to use other transmission media, such as radio links or electric cables.

Each transmission path contains several series-connected fixed stations FS. They can communicate with one or more mobile stations MS by radio. The radio communication takes place in the manner described in DE-OS No. 31 18 018.

On each transmission path, a PCM-30 system is used for each direction of transmission. This system is described in the journal "Elektrisches Nachrichtenwesen", Vol. 48, Nos. 1 and 2, 1973, pp. 72–83. It contains 32 TDM channels, a predetermined number K equal to 30 of which are used for transmitting intelligence signals, while a predetermined number L equal to two remaining channels are control channels.

Each control station LS includes several devices E each having one end of a transmission path connected to it. Each fixed station FS is assigned to one control station LS. The intelligence and control signals are transmitted from and to a given fixed station FS via one and the same device E of the control station LS in charge, regardless of whether the fixed station FS is located in an interconnecting line or a ring line. Assuming that the communication traffic is evenly distributed among all fixed stations FS of the ring lines, the four fixed stations FS in the right-hand portions of the ring lines of FIG. 1 are therefore assigned to a first device E in the control station LS in charge, while the other four fixed stations FS are assigned to another device E of the same control station LS. Since each fixed station FS extracts and processes only those of the signals transmitted over all channels of the PCM-30 systems which are intended for it, and passes all other signals on to the neighboring fixed station FS, a different assignment is also possible. In addition, this permits the TDM channels on each transmission path to be utilized in a twofold manner as follows.

One of the two PCM-30 systems of each transmission path transmits in the right-hand portion of the ring line the signals designated by the first device E for the four fixed stations FS located there. In the left-hand portion, the same channels are occupied with the signals to be transmitted from the fixed stations located there to the other device E of the same control station LS. The other PCM-30 system works correspondingly in the other direction of transmission.

The same applies analogously to the interconnecting lines. There, however, the two devices E at the ends of the lines form part of two different control stations LS. In addition, it is possible and necessary here to transmit signals directly from one control station LS to the other, e.g., when a mobile station MS moves from the area of one control station into the area of another control station. The TDM channels occupied by such signals are utilized only in a single manner. To simplify the channel allocation on the interconnecting lines, the doubly usable channels, i.e., those for communication between a fixed station FS and the associated control station LS, are assigned small channel numbers, i.e., the channel numbers 1 to a predetermined number i beginning with channel number 1, while the channels usable in a single manner are assigned large channel numbers i+1 to the previously-mentioned predetermined number k beginning with channel number k. If, for example, the channels 1 to 5 are utilized in a twofold manner at a given time, the channels 6 to 10 will serve for communication between one of the control stations LS and one or more fixed stations FS associated with this control station; the channels 11 to 23 will be vacant, and the channels 24 to 30 will be occupied with the direct communication traffic between the two control stations LS.

In the event of a fault in a transmission path, the assignment of the fixed stations FS to the control stations LS is changed so that each fixed station FS is connected to a control station LS via the faultless portion of the transmission path. To this end, each control station LS contains means for locating the fault and for actuating a switch SS (FIG. 2) in each of the fixed stations adjacent to the fault via one of the two control channels. This switch opens the transmission path, and on both sides of the interruption, it connects the ends of the lines 1a to 1d (FIG. 2) together, namely 1a to 1b and 1c to 1d.

Figure 2:
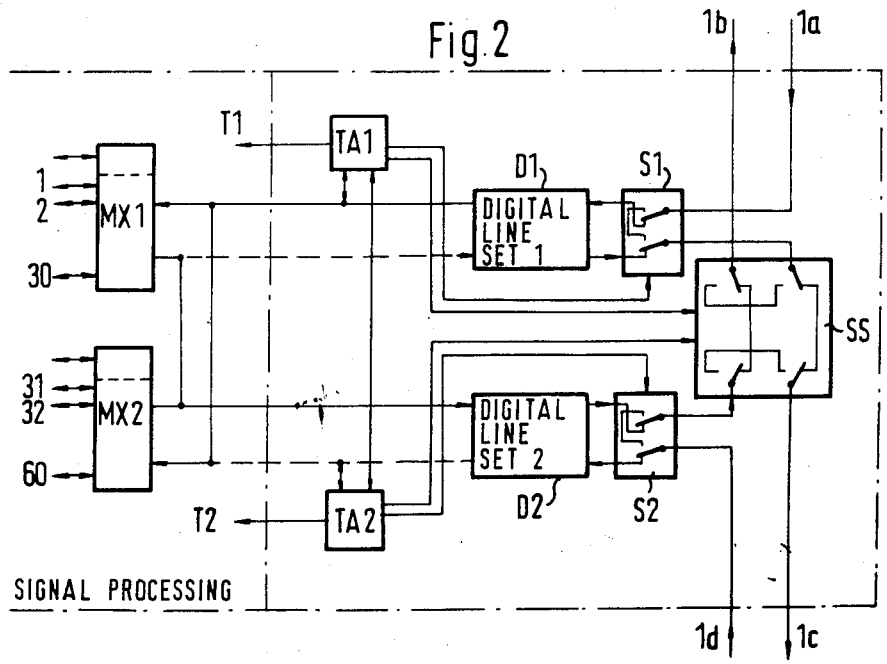
FIG. 2 is a block diagram of a portion of a fixed station.

FIG. 2 shows a portion of a fixed station in a block diagram which illustrates how the fixed station is connected into the transmission path. The latter is indicated by the two lines 1a, 1c and 1d, 1b, respectively. The lines are equipped with PCM-30 systems.

The line 1a, 1c contains a switch S1, a digital line set D1, and the switch SS, and the line 1d, 1b contains a switch S2, a digital line set D2, and the switch SS.

The digital line set D1 is connected to a first clock/alarm circuit TA1 and two multiplexer/demultiplexers MX1 and MX2, called "muldexers". The digital line set D2 is connected to a second clock/alarm circuit TA2 and to the muldexers MX1 and MX2. The clock/alarm circuit TA1 is coupled to the switches S1 and SS, and the clock/alarm circuit TA2 to the switches S2 and SS. The two clock/alarm circuits are connected together.

During trouble-free operation of the communication system, the switches S1, S2, and SS are in the positions shown in FIG. 2. The digital line set D1 extracts from the signals arriving over 1a the signals intended for it, and passes these signals to the mobile stations via the muldexer M1 or MX2 and further components (not shown).

The other signals are transferred over 1c to the next fixed station. In the reverse direction, the signals received from the mobile stations are fed into the line 1b via the muldexer MX1 or MX2 and the digital line set D2.

In the event of a failure in the digital line set D1, the clock/alarm circuit TA1 changes the position of the switch S1 to disconnect the digital line set D1 from the line 1a, 1c, and transmits a fault message via the clock/alarm circuit TA2 and the digital line set D2 on the control channel to the control station in charge. The latter changes the position of the switch SS as described above, and assignes the fixed station and, if necessary, the neighboring fixed stations to the other control station or, in the case of ring lines, to the other device E at the other end of the ring line. The digital line set D2 now transmits intelligence and control signals intended for this fixed station in both directions.

The two control channels of each PCM-30 system serve to supply clock pulses to the fixed stations FS and to transmit all necessary control signals, particularly signals for assigning the TDM channels to the mobile stations MS, for establishing and clearing connections between a mobile station MS and a control station LS, for handing off the mobile station from one fixed station to the neighboring fixed station without interrupting the communication link, for transmitting busy signals etc., and for controlling the communication system during normal operation and in the event of a malfunction.

The clock/alarm units TA1 and TA2 monitor the associated digital line sets D1 and D2, respectively, process alarm signals, and perform further functions, particularly clock synchronization and the clock supply to the fixed station.

We claim:

1. A communications system including a plurality of control stations, a plurality of fixed stations and a plurality of mobile stations capable of communicating with selected ones of said plurality of fixed stations by radio, said communications systems being divided into cells each cell containing a control station and at least two fixed stations controlled by that control station, at least one of said plurality of control stations being colocated with an interface facility for providing connection of said at least one of said plurality of control stations to an automatic telephone network, and said plurality of control stations being interconnected by interconnecting transmission paths, the improvement in said communications system comprising:

a plurality of closed transmission paths, each of said plurality of closed transmission paths being connected to an associated one of said plurality of control stations and each of said plurality of closed transmission paths beginning and ending at a predetermined one of said plurality of control stations associated therewith;

means for connecting each of said plurality of fixed stations to one of said transmission paths to enable each of said plurality of fixed stations to receive intelligence and control signals therefrom and to impart intelligence signals thereto, each of said transmission paths being bidirectional and having a predetermined number K of time-division multiplex channels provided for intelligence signals and a predetermined number L of separate time-division multiplex channels provided for control signals in each direction;

means for assigning the control of fixed stations connected to said interconnecting transmission paths interconnecting at least first and second ones of said plurality of control stations in such manner that each of said first and second control stations controls communications from and to those fixed stations located on said interconnecting transmission paths nearest it, and for communication between one of said first and second control stations and the fixed stations controlled thereby and between another of said first and second control stations and the fixed stations controlled thereby, the occupation of said predetermined number K of channels begins at a first channel, while for direct communication between said first and second control stations the occupation of the K channels begins at channel K, and further channels are occupied in a continuous sequence, incrementally for said communications with said fixed stations, and decrementally for said direct control station communication.

2. A communications system including a plurality of control stations, a plurality of fixed stations and a plurality of mobile stations capable of communicating with selected ones of said plurality of fixed stations by radio, said communications systems being divided into cells each cell containing a control station and at least two fixed stations controlled by that control station, at least one of said plurality of control stations being colocated with an interface facility for providing connection of said at least one of said plurality of control stations to an automatic telephone network, and said plurality of control stations being interconnected by interconnecting transmission paths, the improvement in said communications system comprising:

a plurality of closed transmission paths, each of said plurality of closed transmission paths being connected to an associated one of said plurality of control stations and each of said plurality of closed transmission paths beginning and ending at a predetermined one of said plurality of control stations associated therewith;

means for connecting each of said plurality of fixed stations to one of said transmission paths to enable each of said plurality of fixed stations to receive intelligence and control signals therefrom and to impart intelligence signals thereto, each of said transmission paths being bidirectional and having a predetermined number K of time-division multiplex channels provided for intelligence signals and a predetermined number L of separate time-division muitiplex channels provided for control signals in each direction;

means provided at each of said plurality of fixed stations for recognizing intelligence and control signals transmitted in either direction on a connected transmission path which are directed thereto and for further conveying intelligence and control signals not intended therefor in the same direction of transmission to neighboring ones of said plurality of fixed stations on said connected transmission path; and means for assigning the control of communications from and to fixed stations connected to each of said plurality of closed transmission paths to first and second portions of said associated one of said plurality of control stations to which a given one of said closed transmission paths is connected, communication from and to fixed stations located nearest to said first portion of said associated control station being controlled from said first portion of said associated control station while communication from and to fixed stations located nearest to said second portion of said associated control station being controlled from said second portion of said associated control station.

3. The communications system according to claim 2 wherein each of said plurality of control stations having a closed transmission path connected thereto includes means for locating faults in said connected closed transmission path and means for opening said transmission path at fixed stations adjacent to a fault to cause information to be rerouted through said adjacent fixed stations to properly operating portions of said closed transmission path.

4. The communications system according to claim 2 wherein each of said plurality of fixed stations connected to a closed transmission path includes means for signaling a fault condition to said associated one of said plurality of control stations connected to that closed transmission path and means responsive to said associated control station to shift control of communications for that fixed station from one of said first and second portions of said control station to another of said first and second portions thereof.

5. The communications system according to claim 2 wherein said interconnecting transmission paths include an additional transmission path and upon an occurrence of a fault in a transmission path interconnecting control stations, intelligence and control signals to be exchanged between interconnected control stations are transmitted through portions of said interconnecting transmission paths not exhibiting said fault.

* * * * *